United States Patent
Boyapalle et al.

(10) Patent No.: US 11,665,546 B2
(45) Date of Patent: May 30, 2023

(54) SYSTEMS AND METHODS OF EXECUTING A CHAIN OF TRUST WITH AN EMBEDDED CONTROLLER TO SECURE FUNCTIONALITIES OF AN INTEGRATED SUBSCRIBER IDENTIFICATION MODULE (ISIM)

(71) Applicant: Dell Products, LP, Round Rock, TX (US)

(72) Inventors: Anantha K. Boyapalle, Cedar Park, TX (US); Abeye Teshome, Austin, TX (US); Venkata S. Prayaga, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 304 days.

(21) Appl. No.: 17/208,384

(22) Filed: Mar. 22, 2021

(65) Prior Publication Data
US 2022/0303779 A1   Sep. 22, 2022

(51) Int. Cl.
| | |
|---|---|
| *H04M 1/66* | (2006.01) |
| *H04W 12/72* | (2021.01) |
| *H04W 12/069* | (2021.01) |
| *H04W 12/60* | (2021.01) |
| *G06F 21/57* | (2013.01) |

(Continued)

(52) U.S. Cl.
CPC .......... *H04W 12/72* (2021.01); *G06F 21/575* (2013.01); *H04W 12/041* (2021.01); *H04W 12/0431* (2021.01); *H04W 12/069* (2021.01); *H04W 12/66* (2021.01); *H04W 84/12* (2013.01)

(58) Field of Classification Search
CPC .......... H04W 12/041; H04W 12/0431; H04W 12/72; H04W 12/06; H04W 12/062; H04W 12/065; H04W 12/069
See application file for complete search history.

(56) References Cited

U.S. PATENT DOCUMENTS

| | | |
|---|---|---|
| 9,450,759 B2 | 9/2016 | Hauck |
| 9,788,209 B2 | 10/2017 | Huack |

(Continued)

FOREIGN PATENT DOCUMENTS

| | | |
|---|---|---|
| WO | 2020/071974 A1 | 4/2020 |
| WO | 2020/071975 A1 | 4/2020 |

*Primary Examiner* — Shantell L Heiber
(74) *Attorney, Agent, or Firm* — Prol Intellectual Property Law, PLLC; H. Kenneth Prol

(57) ABSTRACT

A method of securing functionalities of an integrated subscriber identification module (iSIM) on an information handling system may include with an embedded controller (EC), detecting a powering-up process at the information handling system and determine a chain of trust access keys during bootup; with the execution of the EC, detecting and activating a wireless wide area network (WWAN) module; with the execution of the EC, detecting and accessing an integrated subscriber identity module (iSIM); with the execution of the EC, authenticating access to iSIM content including authorization information and carrier profile information with the chain of trust access keys generated from encryption keys based on digital signatures; and sending the authorization information and carrier profile information form the iSIM to the WWAN module for authentication, wirelessly, with a switched multimegabit data service (SM-DS) server associated with the carrier profile.

20 Claims, 5 Drawing Sheets

(51) Int. Cl.
*H04W 12/041* (2021.01)
*H04W 84/12* (2009.01)
*H04W 12/0431* (2021.01)

(56) References Cited

U.S. PATENT DOCUMENTS

| | | |
|---|---|---|
| 10,615,989 B2 | 4/2020 | Kreft |
| 2011/0055534 A1* | 3/2011 | Chung .................. G06F 9/4401 |
| | | 713/300 |
| 2015/0161415 A1 | 6/2015 | Kreft |
| 2016/0359635 A1 | 12/2016 | Kreft |
| 2017/0098083 A1* | 4/2017 | Henry .................. G06F 21/554 |
| 2017/0279619 A1 | 9/2017 | Yang |
| 2018/0314811 A1* | 11/2018 | Hung .................. G06V 40/172 |
| 2019/0007835 A1 | 1/2019 | Li |
| 2019/0041929 A1* | 2/2019 | Bologna ................ G05B 15/02 |
| 2019/0140852 A1 | 5/2019 | Kreft |
| 2021/0157760 A1* | 5/2021 | Kaier .................... H04L 9/0822 |
| 2021/0367769 A1* | 11/2021 | Medaglia ............... G11C 14/00 |

* cited by examiner

SYSTEMS AND METHODS OF EXECUTING A CHAIN OF TRUST WITH AN EMBEDDED CONTROLLER TO SECURE FUNCTIONALITIES OF AN INTEGRATED SUBSCRIBER IDENTIFICATION MODULE (ISIM)

FIELD OF THE DISCLOSURE

The present disclosure generally relates to integrated subscriber identification module (iSIM) provisioning. The present disclosure more specifically relates to iSIM content authentication within an information handling system over a network.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include an antenna system that allows the information handling system to be operatively coupled to a wireless communication network.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
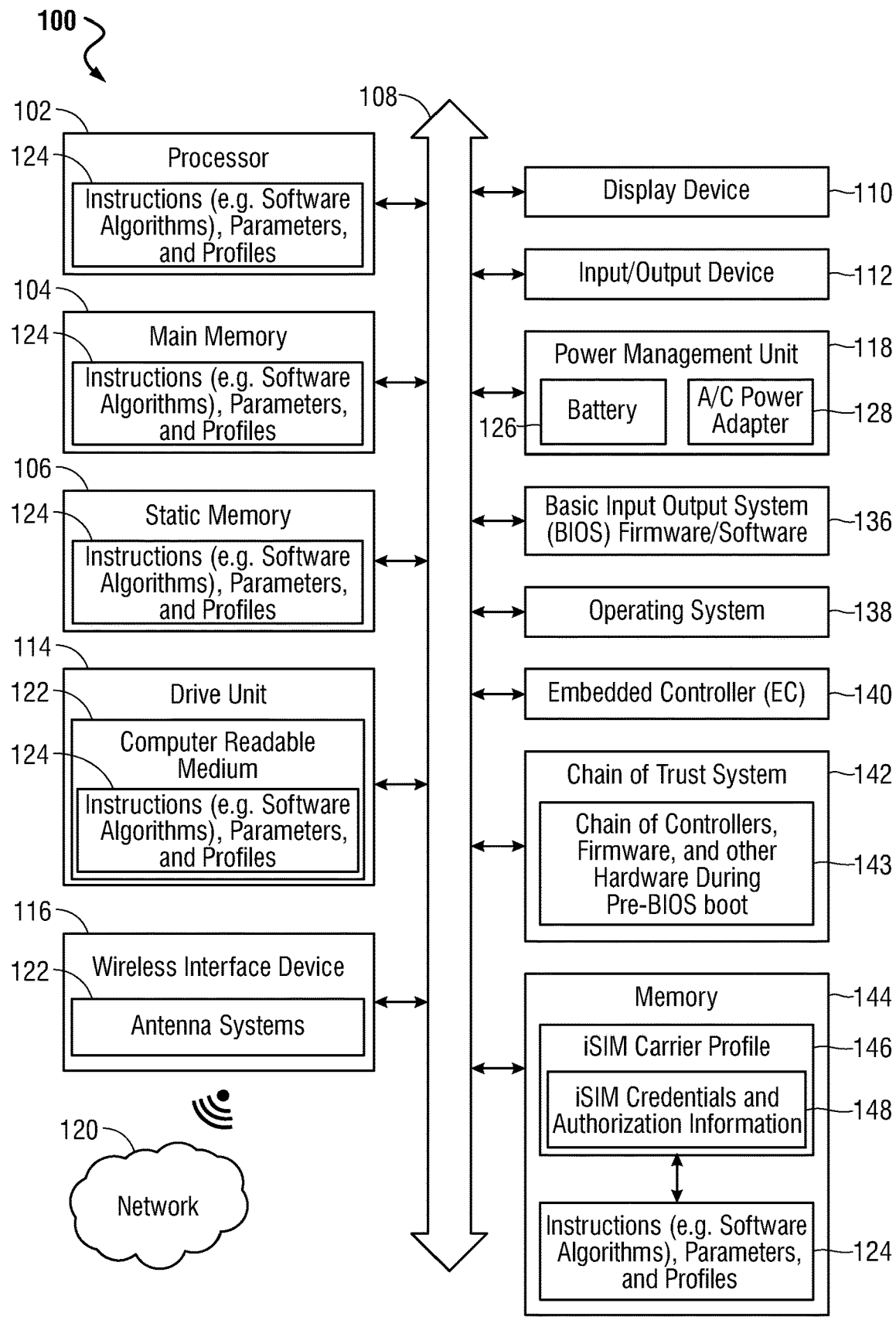
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for a system and method of authenticating content such as authorization information and carrier profile information maintained on an iSIM using an embedded controller to assure a chain of trust from each firmware module and hardware component executed during a boot process. During operation of an information handling system a chain of trust may be established to validate each component of hardware, firmware, and/or software to boot using digital signatures which may, in an embodiment, originate from the embedded controller (EC) or other microcontroller operated prior to the execution of the basic input/output system (BIOS) and/or operating system (OS). With the chain of trust, the boot sequence and hardware, firmware, or software components used to define the chain of trust are unique to the information handling system and, therefore, able to secure an on-board iSIM module on that information handling system. This chain of trust may be used to establish a chain of trust key or code for access to secured data, such as iSIM data used to access subscriber-based or otherwise secure wireless network access.

By establishing a chain of trust from boot by the EC, the systems and methods described herein may reduce the number of system level attacks to the information, content, or data maintained on the iSIM on a unique information handling system. Theses system level attacks include attacks to obtain this iSIM content above the OS level. The system and method described herein extends the chain of trust to the EC gaining access to the iSIM content to obtain and authenticate any authorization information and carrier profile information on the iSIM in order to cause a network interface device (NID) component, such as a WWAN module, to establish communication with a wireless carrier and hand over the operations of the NID to the OS upon authentication and when communication is established. This allows the EC to access the iSIM content wherever it is maintained on the information handling system and secure that content without subjecting the authorization information and carrier profile information to access during these attacks without chain of trust access key or codes. Because the iSIM content may be digitally maintained at a memory associated with the WWAN, at a memory associated with the EC, on a flash memory device, or as part of a memory of a system-on-chip (SOC) of the information handling system, the chain of trust processes allows the EC to initiate and maintain that chain of trust to any device where this iSIM content is maintained without the OS accessing this content which may thereby subject it to potential attacks. This further allows a computer manufacturer to own a root of trust (e.g., at the EC) to the iSIM and control and manage the keys used for authentication and authorization of the iSIM content which requires an attacker to know hardware, firmware, software, bootloader, or other factors of the information handling system to conduct an attack on a chain of trust. In an embodiment, the iSIM content may be managed remotely via a remote computing device. This management of the iSIM content may, for example, be conducted by a switched multi-megabit service (SM-DS) or the like. In an embodiment, the SM-DS may communicate with the information handling system 100 via an out-of-band (OOB) communication. This management of the iSIM content by the SM-DS may include providing subscriber-verification that the user is allowed to access any providers' network, provide the iSIM carrier profile, or provide the iSIM credentials and authorization information for use by the information handling system during a boot-up process.

In an embodiment described herein, further authentication and authorization to access and use the authorization information and carrier profile information maintained on the iSIM may be conducted by the EC. In some instances, multiple sets of authorization information and carrier profile information may be maintained at the iSIM so that the information handling system may switch between an initial or primary wireless carrier and any number of subsequent wireless carriers. In these embodiments, the OS may periodically ping a wireless carrier or a wireless carrier may periodically ping the information handling system. In these embodiments, the EC may intercept these pings and act as the root of trust to access the authorization information and carrier profile information maintained at the iSIM.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include memory (volatile (e.g., random-access memory, etc.), non-volatile (read-only memory, flash memory etc.) or any combination thereof), one or more processing resources, such as a central processing unit (CPU), a graphics processing unit (GPU), one or more microcontrollers, hardware or software control logic, or any combination thereof. Additional components of the information handling system 100 can include one or more storage devices, one or more communications ports for communicating with external devices, as well as, various input and output (I/O) devices 112, such as a keyboard, a mouse, a video/graphic display 110, or any combination thereof. The information handling system 100 can also include one or more buses 108 operable to transmit communications between the various hardware components. Portions of an information handling system 100 may themselves be considered information handling systems 100.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), other processors, microcontrollers including embedded controllers such as 140, control logic or some combination of the same. Any of the processing resources may operate to execute code that is either firmware or software code. Moreover, the information handling system 100 can include memory such as main memory 104, static memory 106, computer readable medium 122 storing instructions 124. Computer readable medium 122 may store instructions 124 or data in firmware or software for the chain of trust system 142, or iSIM carrier profile 146 of embodiments herein, in static memory 106, and drive unit 114 or other memory storage (volatile (e.g., random-access memory, etc.), non-volatile (read-only memory, flash memory etc.) or any combination thereof). The information handling system 100 can also include one or more buses 108 operable to transmit communications between the various hardware components such as any combination of processors, memory, NID 116, and various input and output (I/O) devices 112 or display 110.

The information handling system 100 may further include a video/graphic display device 110. The video/graphic display device 110 in an embodiment may function as a liquid crystal display (LCD), an organic light emitting diode (OLED), a flat panel display, or a solid-state display. Additionally, the information handling system 100 may include an input/output device 112, such as a cursor control device (e.g., mouse, touchpad, or gesture or touch screen input, and a keyboard. The information handling system 100 can also include static memory 106 or a disk drive unit 114.

The network interface device (NID) 116 can provide connectivity to a network 120, e.g., a wide area network (WAN), a local area network (LAN), wireless local area network (WLAN), a wireless personal area network (WPAN), a wireless wide area network (WWAN), or other networks. Connectivity may be via wired or wireless connection. The wireless NID 116 may include one or more radio frequency subsystems with transmitter/receiver circuitry, modem circuitry, one or more radio frequency front end circuits, one or more wireless controller circuits, amplifiers, antenna systems 132 and other radio frequency subsystem circuitry for wireless communications via multiple radio access technologies. These radio access technologies may include WiFi communications, Bluetooth, near-field communication (NFC) technologies, or mobile network carrier technologies. The NID 116 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one NID 116 may operate two or more wireless links. In an embodiment, low power wireless data communications, for example, may be received via the low power antenna system 132 and antenna front end. The NID 116 may also operate in accordance with any cellular wireless data communication standards in the embodiments herein. The NID 116, in an embodiment, may connect to any combination of macro-cellular wireless connections including 2G, 2.5G, 3G, 4G, 5G or the like from one or more service providers. Access to subscriber-band wireless network may require authentication via authentication keys and subscription details available with a subscriber identity module (SIM). In particular embodiments herein, an integrated SIM (iSIM) may be utilized for access to subscriber-based wireless networks such as 4G or 5G networks via service providers or mobile virtual network operators (MV-NOs) according to embodiments of the present disclosure. Utilization of radiofrequency communication bands according to several example embodiments of the present disclosure may include bands used with the WWAN standards, which may operate in both licensed and unlicensed spectrums. More specifically, the NID 116, in an embodiment, may transceive within radio frequencies associated with the 5G New Radio (NR) Frequency Range 1 (FR1) or Frequency Range 2 (FR2), or those associated with 4G LTE and other standards predating the 5G communications standards now emerging. NRFR1 may include radio frequencies below 6 GHz. NRFR2 may include radio frequencies above 6 GHz, made available within the now emerging 5G communications standard. Communications within the WLAN or WWAN may be enabled through the use of either an evolved Node B (eNodeB) executing an evolved packet core of an existing LTE system, or a Next Generation Node B (gNodeB) executing the next generation packet core of the 5G cellular standard.

The NID 116 may also include radio frequency subsystems circuitry used to connect to any combination of macro-cellular wireless connections including 2G, 2.5G, 3G, 4G, 5G or the like from one or more service providers such as a WWAN service provider. Utilization of radiofrequency communication bands according to several example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band for WLAN. WLAN, in another example, may also operate at a 2.4 GHz band. WWAN may operate in a number of bands, some of which are proprietary but may include a wireless communication frequency band at approximately 2.5 GHz or 5 GHz bands for example. In additional examples, WWAN carrier licensed bands may operate at frequency bands of approximately 700 MHz, 800 MHz, 1900 MHz, or 1700/2100 MHz as well as the NRFR1, NRFR2, bands, and other known bands.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In some embodiments of the present disclosure, on EC 140 and other controller units and firmware may be booted in a sequence prior to the BIOS or OS bootup and may be utilized as a chain of trust for the information handling system 100.

In accordance with various embodiments of the present disclosure, the methods described herein may be implemented by firmware or software programs executable by a controller, a microcontroller, or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 120 can communicate voice, video or data over the network 120. Further, the instructions 124 may be transmitted or received over the network 120 via the NID 116.

The information handling system 100 can include a set of instructions 124 that can be executed to cause the computer system to perform any one or more of the methods or computer-based functions disclosed herein. For example, instructions 124 may execute a chain of trust system 142, an iSIM carrier profile 146, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The static memory 106 or disk drive unit 114 accessible by an EC140 may execute the chain of trust system 142 for access to an iSIM carrier profile 146 that may be stored in a secured computer-readable medium 122 in which one or more sets of instructions 124 such as firmware or software can be embedded. Similarly, main memory 104 and static memory 106 may also contain a computer-readable medium for storage of one or more sets of instructions, parameters, or profiles 124. The disk drive unit 114 and static memory 106 may also contain space for data storage. Further, the instructions 124 may embody one or more of the methods or logic as described herein. For example, instructions relating to the chain of trust system 142 software algorithms, processes, and/or methods may be stored here. In a particular embodiment, the instructions, parameters, and profiles 124 may reside completely, or at least partially, within the main memory 104, the static memory 106, and/or within the disk drive 114 during execution by the processor 102 of information handling system 100. As explained, some or all of the chain of trust system 142 and iSIM carrier profile 146 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The chain of trust system 142 or iSIM carrier profile 146 may be stored in static memory 106, a dedicated memory 144, or the drive unit 114 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may include the chain of trust system 142 that may be operably connected to the bus 108. The computer-readable medium 122 associated with the chain of trust system 142 may also contain space for data storage or access to the data storage. The chain of trust system 142 may, according to the present description, perform tasks related to ensuring that a chain of trust is established between each component of hardware, firmware, and/or software during a boot process. As such a chain of controllers, firmware, and other hardware used during pre-BIOS boot 143 may generate a chain of trust that provides for a secure access to any iSIM carrier profiles (including iSIM credentials and authorization information) maintained on the iSIM. In an embodiment, the chain of controllers, firmware, and other hardware used during pre-BIOS boot 143 may be a predetermined list and/or sequence of controllers, firmware, and other hardware used by the EC 140 to authenticate any software executed or hardware used pre-BIOS to secure the boot up process of the information handling system 100 to a wireless network. In an embodiment, the chain of controllers, firmware, and other hardware used during pre-BIOS boot 143 may be proprietary to the manufacturer such that a hash value, for example, may be created by the digital signatures from the chaining of a specific number, type, and sequence of firmware and hardware in an example embodiment. Such a hash value may be used to a matching hash value securing the iSIM carrier profile 146 thereby allowing access to the iSIM carrier profile 146 in an embodiment. Other types of chain of trust key or code may also be generated from the chain of trust boot up process 143 occurring during pre-BIOS boot. This chain of trust may be established by the embedded controller (EC) 140 executing the computer readable program code defining the chain of trust system 142 so that the EC may serve as the root of trust to the validation of all other hardware, firmware, and/or software subsequently called by the EC 140. In an embodiment, only those instances of hardware, firmware, and/or software that have been digitally signed by a preceding instance of hardware, firmware, and/or software or by the EC 140 may be trusted and therefor allowed to operate on the information handling system 100. In normal operations, this chain of trust would move forward until the basic input/output system (BIOS) firmware/software 136 and operating system (OS) 138 have been initiated.

The execution of the chain of trust system 142 by the EC 140 allows the EC 140 to safeguard any potentially sensitive information maintained on the information handling system 100. In the embodiments described herein, this sensitive information includes the data, information, and content maintained on the integrated subscriber identity module (iSIM) referred to herein as the iSIM carrier profile 146 such as in a dedicated memory 144 or other secured memory. The iSIM carrier profile 146 may include data, information, and content that allows a NID 116 of the information handling system 100 to operatively couple to a wireless network such as those wireless networks associated with mobile wireless carriers. Indeed, the iSIM carrier profile 146 may include a plurality of sets of information, data, and content that allows the NID 116 of the information handling system 100 to operatively couple the information handling system 100 to one or more wireless network carriers and their services.

The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), the video/graphic display device 110, and other components that may require power when a power button has been actuated by a user. In an embodiment, the PMU 118 may be electrically coupled to the bus 108 to provide this power. The PMU 118 may regulate power from a power source such as a battery 126 or A/C power adapter 128. In an embodiment, the battery 126 may be charged via the A/C power adapter 128 and provide power the to the components of the information handling system 100 when A/C power from the A/C power adapter 128 is removed.

In the embodiments described herein, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

During operation, the user may turn on the information handling system 100 and initiate a boot-up process. This boot-up process may include the EC 140 or any other microcontroller, controller or processor initiating the chain of trust system 142. In an embodiment, the EC 140 may be determined to be the root-of-trust or trust anchor. In an embodiment, when the power is applied to the information handling system 100 by, for example, activation of a power button, a bootloader may load and authenticate firmware of the information handling system 100 which includes the chain of trust system 142 as described herein. By executing the chain of trust system 142 with the EC 140 each layer of available firmware authenticates the next layer until the secure boot process completes and the BIOS firmware/software 136 and OS 138 are eventually initiated. However, during this process, the EC 140 may execute the chain of trust system 142 for pre-BIOS boot sequences and use such chain of trust boot operation as authentication keys or codes to access, exclusively, the iSIM carrier profile 146 with its iSIM credential and authorization information 148. Such pre-BIOS boot sequence and the controller and firmware involved is accessible to a manufacturer and potentially an information technology (IT) manager of an information handling system 100 and may not involve BIOS or OS boot aspects thus further shielding this chain of trust from attack in some embodiments.

As described herein, the iSIM credential and authorization information 148 may comprise a plurality of sets of authorization information and carrier profile information used by the information handling system 100 to be operatively coupled to a switched multimegabit data (SM-DS) server associated with one or more carrier networks for subscriber access. With this accessed iSIM credential and authorization information 148, the EC 140 may cause the NID 116 to activate one or more antennas 132 associated with the NID 116 in order to wirelessly communicate with the appropriate SM-DS servers. The chain of trust system 142 may, therefore, be extended to the NID 116 with the digital signatures defining the chain of trust provided by the execution of the chain of trust system 142. In an embodiment, these digital signatures may be encrypted keys that verify that the chain of trust is secure and the iSIM credential and authorization information 148 is not compromised to attack and may be utilized for network access.

In the embodiments described herein, the EC 140 may receive confirmation from the SM-DS server, via the MD 116, that the information handling system 100 is operatively coupled to the wireless carrier network associated with the authorization information and carrier profile information defined in the iSIM carrier profile 146. At this point, the information handling system 100 may receive a ping or signal from the wireless carrier (e.g., from the SM-DS server) requesting, among other data from the information handling system 100, confirmation that the iSIM credential and authorization information 148 via the authorization information and carrier profile information is authorized to access the network of the wireless carrier. Whatever the frequency of the receipt of the pings from the wireless carrier, the EC 140 may intercept these pings or be the root of trust to access the iSIM carrier profile 146 and the iSIM credential and authorization information 148 to again authenticate access to the wireless carrier network (e.g., network 120) as described herein. This ensures that the data on the iSIM carrier profile 146 and its iSIM credential and authorization information 148 is completed during run-time of the information handling system 100 as well. Indeed, once the EC 140 has handed over operation of the NID 116 to the BIOS firmware/software 136 and OS 138, the EC 140 may still intercept these pings to authorize this data. This process places the root of trust at the EC 140 by the chain of trust system 142 thereby reducing the occurrence of attacks on the information maintained at the iSIM carrier profile 146.

As the EC 140 accesses the iSIM carrier profile 146, the EC 140 may access certain other hardware where the iSIM carrier profile 146. As described herein, the iSIM carrier profile 146 may be digitally maintained at a memory associated with the WWAN, at a memory associated with the EC, on a flash memory device, or as part of a memory of a system-on-chip (SOC). Because the iSIM carrier profile 146 may be placed on any chip, memory device, or be formed into its own module, the EC 140, during boot-up, may access specific hardware or firmware in order to gain access to this information. In an embodiment, the iSIM carrier profile 146 may be formed on a memory device associated with the EC 140 itself (e.g., a dedicated memory such as a static memory). In this embodiment, the EC 140 may not need to access any other hardware to gain access to the iSIM carrier profile 146 thereby increasing the efficiency and speed of operatively coupling the information handling system 100 to a network 120 operated by the appropriate wireless carrier. In another embodiment, the iSIM carrier profile 146 may be maintained on a flash memory device operatively coupled to the information handling system 100. In this embodiment, during a boot-up process of the information handling system 100, the EC 140 may, as the root of trust, access a port or other hardware where the flash memory is located, pass on an encrypted digital signature or chain of digital signatures to the hardware using the chain of trust system 142, and gain access to the iSIM carrier profile 146 maintained on the flash drive. This allows the chain of trust to be maintained while also securing the data maintained on the iSIM carrier profile 146. In yet another embodiment, the iSIM carrier profile 146 may be integrated into the platform hardware of the information handling system 100 such by either being stored on an existing memory (e.g., associated with a CPU) or stored on a separate module dedicated to storing the iSIM carrier profile 146. Again, the EC 140 may, as the root of trust, access a port or other hardware where the iSIM carrier profile 146 is located, pass on an encrypted digital signature to the hardware using the chain of trust system 142, and gain access to the iSIM carrier profile 146 maintained on the memory device. In yet another embodiment, the iSIM carrier profile 146 may be integrated into the NID 116 (e.g., WWAN module) or a memory associated with the NID 116. In this embodiment, because the EC 140 will gain access to the NID 116 using the chain of trust system 142 as described herein, the placement of the iSIM carrier profile 146 at the NID 116 may allow the EC 140 to access the iSIM carrier profile 146 when access to the NID 116 is completed. This may also reduce the time during boot-up for the EC 140 to be operatively coupled to the network 120 associated with the appropriate wireless carrier. The present specification contemplates that the iSIM carrier profile 146 may be stored and maintained on any memory associated with any hardware device within the information handling system 100 with the ability of the EC 140, using the chain of trust system 142, to gain access to this hardware and memory in order to securely operatively couple the information handling system 100 to the wireless carrier.

Figure 2:
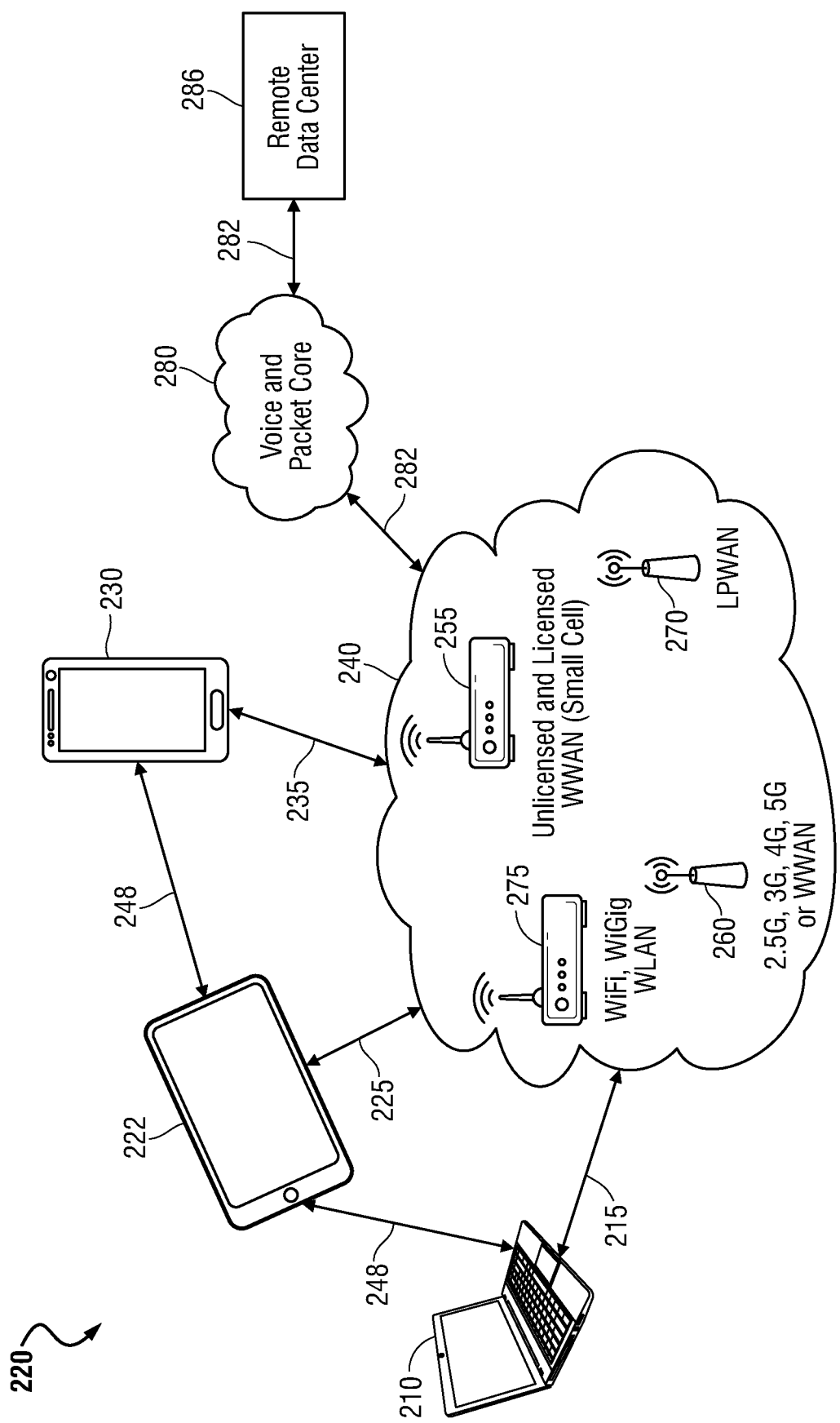
FIG. 2 is a block diagram of a network environment offering several communication protocol options and mobile information handling systems according to an embodiment of the present disclosure.

FIG. 2 is a block diagram of a network environment offering several communication protocol options and mobile information handling systems according to an embodiment of the present disclosure. In a particular embodiment, network 240 includes networked information handling systems 210, 222, and 230 with wireless capabilities, wireless network access points or base stations 255, 260, 270 and 275, and multiple wireless connection link options. A variety of additional computing resources of network 240 may include client mobile information handling systems, data processing servers, network storage devices, local and wide area networks, or other resources as needed or desired. As specifically depicted, systems 210, 222, and 230 may be a laptop computer, tablet computer, 360-degree convertible systems, wearable computing devices, a smart phone device, server systems, or other computing systems. These mobile information handling systems 210, 222, and 230, may access any of a plurality of wireless networks 240 some of which may be subscriber-based networks. In an example embodiment, information handling systems 210, 222, or 230 may be managed information handling systems utilizing the systems and methods disclosed in embodiments herein. Wireless networks 240 may include low power communication technologies such as LPWAN 270, a macro-cellular network 260, or wireless local networks such as 275 including Wi-Fi, WiGig, other WLAN, and small cell WWAN 255. For example, the wireless networks 240 may be the LPWAN network 270 or other low power communication technologies described in embodiments herein for low-power, always-on wireless communication in some embodiments. In other embodiments, wireless networks may include wireless local area networks (WLANs 275) or small cell systems 255, a wireless personal area network (WPAN) as between devices such as 210, 220, and 230, or a wireless wide area network (WWAN) such as a WWAN 260. In an example embodiment, LTE small cell WWAN networks may operate with a wireless access point 255 option such as an eNodeB (eNB) base station, gNodeB (gnB) base station, or other LPWAN base station device. In another example embodiment, LTE-LAA WWAN may operate with a small-cell WWAN wireless access point option 255.

Since WPAN or Wi-Fi Direct Connection and WWAN networks can functionally operate similar to WLANs, they may be considered as wireless local area networks (WLANs) for purposes herein. Components of a WLAN, an LPWAN, or other low power communication technologies may be connected by wireline or Ethernet connections to a wider external network. For example, wireless network access points may be connected to a wireless network controller and an Ethernet switch.

Wireless communications across any of wireless networks 240 may be via standard protocols such as Narrow-band IoT LPWAN, LTE Category Machine LPWAN standards (such as Cat M1), LoRa, Sigfox, other low power communication technologies, IEEE 802.11 Wi-Fi, IEEE 802.11ad WiGig, IEEE 802.15 WPAN, or other emerging 5G small cell WWAN communications such as gNodeB, or similar wireless network protocols. Alternatively, other available wireless links within wireless networks 240 may include macro-cellular connections via one or more service providers at the macro-cellular network 260. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like. Wireless networks 240 may include a variety of licensed, unlicensed or shared communication frequency bands as well as a variety of wireless protocol technologies ranging from those operating in macrocells, small cells, picocells, or femtocells. In an embodiment of the present specification, the service providers 260 of the WWAN carriers may operate over licensed bands at frequency bands of approximately 700 MHz, 800 MHz, 1900 MHz, or 1700/2100 MHz for example as well. A NID (e.g., WWAN module) of the networked information handling systems 210, 222, and 230 in an embodiment may transceive within radio frequencies associated with the 5G New Radio (NR) Frequency Range 1 (FR1) or Frequency Range 2 (FR2). NRFR1 may include radio frequencies below 6 GHz, associated with 4G LTE and other standards predating the 5G communications standards now emerging. NRFR2 may include radio frequencies above 6 GHz, made available within the now emerging 5G communications standard. Communications within NRFR1 may be enabled through the use of either an evolved Node B (eNodeB) executing an evolved packet core of an existing LTE system, or a Next Generation Node B (gNodeB) executing the next generation packet core of the 5G cellular standard.

In some embodiments according to the present disclosure, a networked information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. In the context of the present specification, the networked information handling systems 210, 222, and 230 may include any number of antennas that may operate to first operatively couple the networked information handling system 210, 222, and 230 to a SM-DS via, for example, a WWAN module or other NID accessible to the EC 140 of the networked information handling system 210, 222, and 230. In this embodiment, the EC of the networked information handling system 210, 222, and 230 may gain access to the network 240 using the iSIM carrier profile accessed by the EC as described herein. The networked information handling systems 210, 222, and 230 may further include an antenna that provides for operatively coupling the networked information handling systems 210, 222, and 230 to the service providers 260 operating a WWAN or small cell WWAN using, for example, 5G communication technologies. As described herein, the networked information handling systems 210, 222, and 230 may initially communicate with the SM-DS in order to prove verification of a subscription to the service providers 260 WWAN network suing the iSIM carrier profile accessed by the EC and receive a confirmation from the WWAN carrier that the networked information handling systems 210, 222, and 230 is operatively coupled to the network. This process is described in more detail herein.

Wireless networks 240 may be connected through to a voice and packet core network 280 that may contain externally accessible computing resources and connect to a remote data center 286 in network 240. The voice and packet core network 280 may contain multiple intermediate web servers or other locations with accessible data (not shown). The voice and packet core network 280 may also connect to other wireless networks similar to those shown within 240 and additional mobile information handling systems such as 210, 222, 230 or similar connected to those additional wireless networks. Connection 282 between the wireless networks 240 and remote data center 286 or connection to other additional wireless networks may be via Ethernet or another similar connection to the world-wide-web, a WAN, a LAN, another WLAN, or WWAN, or other network structure. Such a connection 282 may be made via a WLAN or WWAN access point/Ethernet switch to the external network and be a backhaul connection. The access point may be connected to one or more wireless access points in the WLAN or WWAN before connecting directly to a mobile information handling system such as 210, 222, 230 or may connect directly to one or more information handling systems 210, 222, and 230. Alternatively, information handling systems 210, 222, and 230 may connect to the external network via base stations according to various wireless protocols 255, 260, 270 or 275 within any wireless networks 240. The remote data centers 286 or other remote information handling systems may provide central terminals for IT management and security assessment via operation of an SM-DS server authentication system for the iSIM carrier profiles.

Remote data centers 286 may include web servers or resources within a cloud environment that operate via the voice and packet core 280 or other internet connectivity. For example, remote data centers can include additional information handling systems, data processing servers, network storage devices, local and wide area networks, or other resources as needed or desired. In the context of the present specification, the remote data center 286 may include a SM-DS used by the information handling systems such as 210, 222, 230 to access and authenticate the data associated with the iSIM carrier profile maintained on the networked information handling system 210, 222, and 230.

During operation, the user may turn on the networked information handling system 210, 222, and 230 and initiate a boot-up process. This boot-up process may include the EC or any other microcontroller, controller or processor initiating the chain of trust system during boot up or execution of one or more controllers, firmware, or the like as set for the chain of trust system 142. In an embodiment, the EC may be determined to be the root-of-trust or trust anchor. In an embodiment, when the power is applied to the networked information handling system 210, 222, and 230 by, for example, activation of a power button, a bootloader may load and authenticate firmware of the networked information handling system 210, 222, and 230 which includes the chain of trust system as described herein. By executing the chain of trust system with the EC each layer of available firmware authenticates the next layer until the secure boot process completes and the BIOS firmware/software and OS are eventually initiated. However, during this process, the EC may execute the chain of trust system to access, exclusively, the iSIM carrier profile with its iSIM credential and authorization information as described in various embodiments herein.

As described herein, the iSIM credential and authorization information may comprise a plurality of sets of authorization information, subscription information, and carrier profile information used by the information handling system to be operatively coupled to a switched multimegabit data sever (SM-DS) server associated with one or more carrier networks 260, 270. With this accessed iSIM credential and authorization information, the EC may cause the NID (e.g., WWAN module) of the networked information handling system 210, 222, and 230 to activate one or more antennas associated with the NID in order to wirelessly communicate with the appropriate SM-DS servers and be provided access to a subscriber-based wireless network via access point or base station such as licensed small-cell WWAN or carrier band microcellular WWAN access. The chain of trust system may, therefore, be extended to the NID with the digital signatures defining the chain of trust provided by the execution of the chain of trust system. In an embodiment, these digital signatures may be encrypted keys that verify that the chain of trust is secure and the iSIM credential and authorization information is not compromised to attack.

Figure 3:
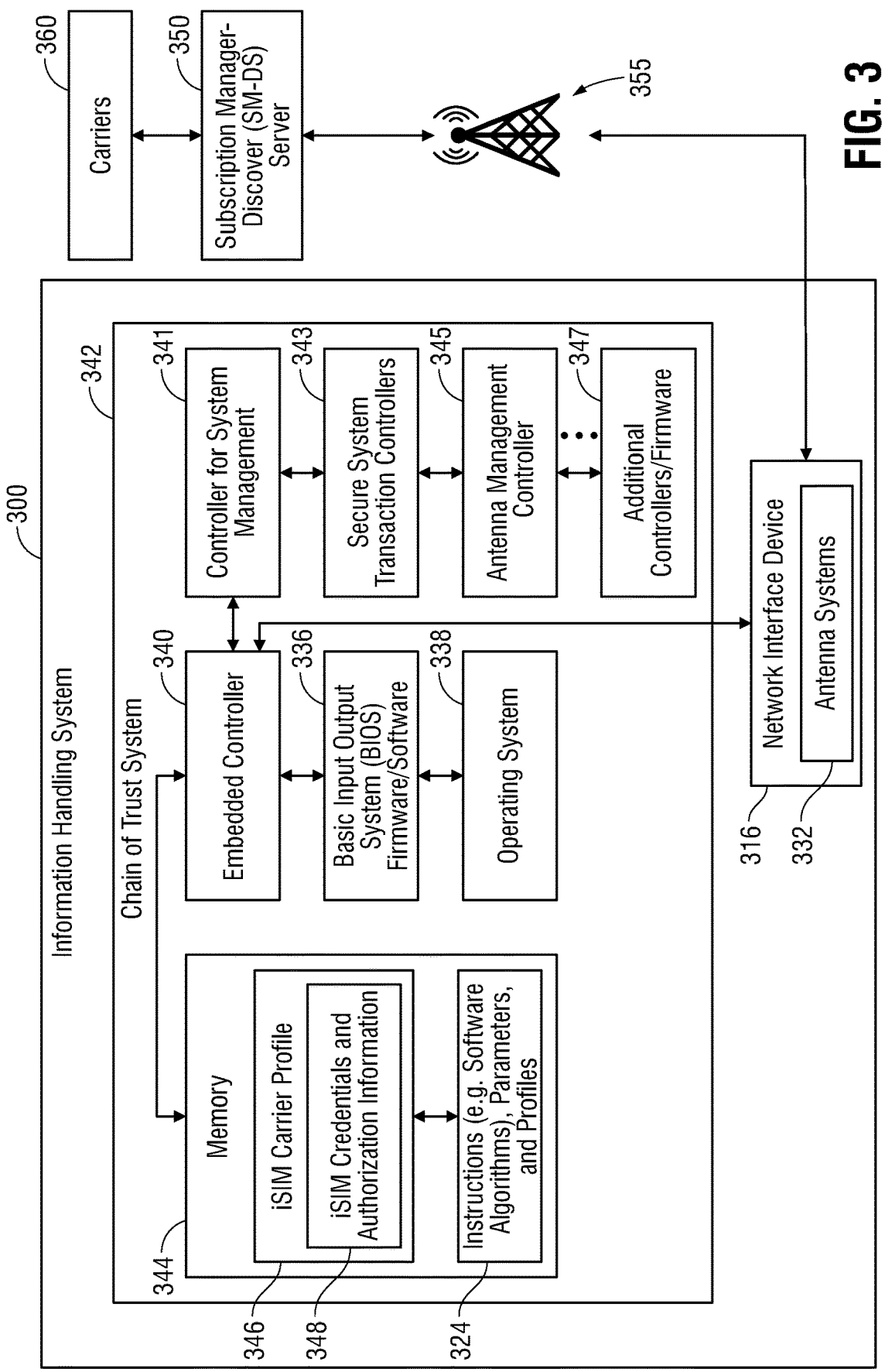
FIG. 3 is a block diagram illustrating an information handling system for authenticating integrated subscriber identification module (iSIM) content in the information handling system with a switched multimegabit data service (SM-DS) server associated with a wireless carrier according to an embodiment of the present disclosure.

FIG. 3 is a block diagram of a system 300 for authenticating integrated subscriber identification module (iSIM) content with a switched multimegabit data service (SM-DS) server 350 associated with a wireless carrier 360 according to an embodiment of the present disclosure. The system 300 includes an information handling system 300, and a carrier 360 (e.g., a WWAN service provider) that operate together to authenticate a WWAN or other type of carrier iSIM profile with an NID 316 of the information handling system 330.

The system 300 may be a chain of trust system 342. The chain of trust system 342 may perform tasks related to ensuring that a chain of trust is established between one or more components of hardware, firmware, and/or software during a boot process. In an embodiment, the chain of trust system 342 may be executed by the EC 340 and assign the EC 340 as the root of trust from which all trust is chained to such as a controller for system management 341, a secure system transaction controller 343, an antenna management controller 345, among any additional controllers/firmware 347. In an embodiment, only those instances of hardware, firmware, and/or software that have been provided with a digital signature by a preceding instance of hardware, firmware, and/or software or by the EC 340 may be trusted and therefor allowed to operate on the information handling system 300. In normal operations, this chain of trust would move forward until the basic input/output system (BIOS) firmware/software and operating system (OS) 338 have been initiated. The sequence of the chain of trust and one or more selected bases (hardware, firmware, etc.) of data during boot up for the chain of trust may be utilized as a chain of trust code or key to verify the authenticity to access an iSIM profile.

The execution of the chain of trust system 342 by the EC 340 allows the EC 340 to utilize the identified chain of trust information as determined from selected hardware, firmware, or sequence etc. to safeguard any potentially sensitive information maintained on the information handling system 300 such as the memory 344 maintaining the iSIM carrier profile 346 with its iSIM credentials and authorization information 348. In the embodiments described herein, this sensitive of the iSIM carrier profile 146 may include any data, information, and content that allows the NID 316 of the information handling system 300 to operatively couple to a wireless network, via a WWAN macro-cellular network 355, for example, as well as any of those wireless networks associated with mobile wireless carriers. Indeed, the iSIM carrier profile 346 may include a plurality of sets of information, data, and content that allows the NID 316 of the information handling system 300 to operatively couple the information handling system 300 to multiple wireless network carriers and their services. The chain of trust may include a sequence of digital signatures from boot up of hardware, firmware etc. known only to the manufacturer and unique to the information handling system and determined or even selected for the specific chain of trust. An example sequence of controllers and firmware may include the controller associated with system management 341, a secure system transaction controller 343, an antenna management controller 345, and may include other controllers/firmware such as Input/Output device controllers, timing controllers (TCONs) for a display, sensor controllers in the information handling system (e.g., sensor hub), camera sensor controllers, global positioning satellite (GPS) controllers, presence detectors, among others. In this example, when the information handling system 300 is activated by a user actuating a power button, the EC 340 may authenticate computer readable program code it is to execute, encrypt the code and then run that code. This allows the EC 340 to measure and validate the computer readable program code before it runs it. By doing so, the EC 340 establishes itself as a root of trust anchor upon which the chain of trust may be established. After this, each instance of microcontroller, firmware, or software measures and authenticates a next set of computer readable program code associated with a next instance of microcontroller, firmware, or software to be executed prior to the execution of the BIOS firmware/software 336 and bootstrapping of the OS 338 in a predetermined sequence. The EC 340 causes this chaining of trust along each instance of microcontroller, firmware, or software in the example sequence thereby creating a chain of digitally signed instance of microcontroller, firmware, or software. In this example, after the EC 340 has been established as the root of trust, the controller associated with system management 341, for example, may then measure and validate the computer readable program code associated with the secure system transaction controller 343 thereby digitally signing that system management controller 341. This continues with each authenticated instance of microcontroller, firmware, or software authenticating the next. The example sequence is meant merely as an example and the present specification contemplates that more or less instances of microcontroller, firmware, or software may be authenticated in any order of sequence. In an embodiment, the number of instances of microcontroller, firmware, or software to be authenticated in the chain as well as the order of that authentication may be pre-programed by the manufacturer of the information handling system 300 and directed by the EC 340. It is appreciated as well that, as part of the sequence of instances of microcontroller, firmware, or software during the chain of trust, the iSIM carrier profile 346 is authenticated. For example, where the iSIM carrier profile 346 is maintained on a memory associated with the WWAN module, one of the instances of microcontroller, firmware, or software to be authenticated includes a WWAN module. Once the WWAN module is authenticated, the EC 340 may initiate the process of authenticating access to the iSIM credentials and authorization information 348 with a SMDS server 350 over a network as described herein.

In an embodiment, as the chain of trust is being created, a hash function or other encryption key or keys may also be created to compare with a hash value or encryption keys associated with and securing the access of the iSIM carrier profile 346 and its iSIM credentials and authorization information 348. For example, a hash function (e.g., chain of trust access keys) may be created based on the sequence of specific instances of microcontroller, firmware, or software authenticated. Continuing on with the example sequence of authenticated instances of microcontroller, firmware, or software above, the hash value may be created by receiving a serial number or other identification number of each microcontroller, firmware, or software within the chain of trust prior to access of the iSIM carrier profile 346. This hash value created from the accumulation of these serial numbers may then be compared to the ash value associated with and securing the access of the iSIM carrier profile 346 and its iSIM credentials and authorization information 348. Where the hash values match, access to the iSIM carrier profile 346 is allowed. Where the hash values do not match, the EC 340 prevents loading of the BIOS firmware/software 336 and OS 338 and may so notify the user of the issue. In a specific embodiment, only those serial numbers associated with specific instances of microcontroller, firmware, or software in the authentication sequence (e.g., in the chain of trust) may be used to create the hash value. Because the EC 340 is pre-programed with the sequence and which instances of microcontroller, firmware, or software to use to create the hash value and because the EC 340 is the root of trust, access to the iSIM carrier profile 346 may be further secured in this manner. Additionally, because this validation using the hash value created is completed below the execution of the BIOS firmware/software 336 and OS 338, the information handling system 300 and specifically the iSIM carrier profile 346 is further protected from attacks from outside sources during boot-up.

As described herein, the iSIM carrier profile 346 may be digitally maintained at a memory associated with the WWAN, at a memory associated with the EC, on a flash memory device, or as part of a memory of a system-on-chip (SOC). Indeed, the iSIM carrier profile 346 may be digitally maintained at a memory associated with any hardware or firmware within the information handling system 300. Because the iSIM carrier profile 346 may be placed on any chip, memory device, or be formed into its own module, the EC 340, during boot-up, may access specific hardware or firmware so as to gain access to this information. In an embodiment, the iSIM carrier profile 346 may be formed on a memory device associated with the EC 340 itself. In this embodiment, the EC 340 may not need to access any other hardware to gain access to the iSIM carrier profile 346 thereby increasing the efficiency and speed of operatively coupling the information handling system 300 to a network operated by the appropriate wireless carrier 360. In another embodiment, the iSIM carrier profile 346 may be maintained on a flash memory device operatively coupled to the information handling system 300. In this embodiment, during a boot-up process of the information handling system 300, the EC 340 may, as the root of trust, access a port or other hardware where the flash memory is located, pass on an encrypted digital signature to the hardware using the chain of trust system 342, and gain access to the iSIM carrier profile 346 maintained on the flash drive. This allows the chain of trust to be maintained while also securing the data maintained on the iSIM carrier profile 346. In yet another embodiment, the iSIM carrier profile 346 may be integrated into the platform hardware of the information handling system 300 such by either being stored on an existing memory (e.g., associated with a CPU) or stored on a separate module dedicated to storing the iSIM carrier profile 346. Again, the EC 340 may, as the root of trust, access a port or other hardware where the iSIM carrier profile 346 is located, pass on an encrypted digital signature to the hardware using the chain of trust system 342 beginning with the root of trust at the EC 340, and gain access to the iSIM carrier profile 346 maintained on the memory device. In some embodiments, additional controllers or firmware in the boot sequence may provide the last digital signature or a sequence of digital signatures to generate a chain of trust code for access to the iSIM carrier profile 346. In yet another embodiment, the iSIM carrier profile 346 may be integrated into the NID 316 (e.g., WWAN module) or a memory associated with the NID 316. In this embodiment, because the EC 340 will gain access to the NID 316 and the iSIM carrier profile 346 using the chain of trust system 342 as described herein, the placement of the iSIM carrier profile 346 at the NID 316 may allow the EC 340 to access the iSIM carrier profile 346 when access to the NID 316 is completed. This may also reduce the time during boot-up for the EC 340 to be operatively coupled to the network associated with the appropriate wireless carrier. The present specification contemplates that the iSIM carrier profile 346 may be stored and maintained on any memory associated with any hardware device within the information handling system 300 with the ability of the EC 340, using the chain of trust system 342, to gain access to this hardware and memory in order to securely operatively couple the information handling system 300 to the wireless carrier.

As the EC 340 gains access to the iSIM carrier profile 346, the EC 340 may access the NID 316 in order to operatively couple the information handling system 300 to the SM-DS server 350 associated with the appropriate carrier 360. Again, the EC 340 may execute the chain of trust system 342 in order to, as the root of trust, provide a digital signature to the iSIM carrier profile 346 so that the communication between the EC 340 and NID 316 is secured and the chain of trust is maintained while, for example, the NID 316 may utilize the accessed iSIM carrier profile 346 to establish wireless links to the subscriber-based carrier wireless network. Further, the EC 340 also may continue to boot the BIOS firmware/software 336 and OS 338. Because the EC 340 is transmitting the iSIM carrier profile 346 to the NID 316, this transmission should be secure. When the NID 316 receives the iSIM carrier profile 346 and its associated iSIM credentials and authorization information 348, the NID 316 may activate an antenna system 332 to operatively couple the information handling system 300 to the SM-DS server 350 via the WWAN macro-cellular network 355. The NID 316 communicates with the SM-DS server 350 to authenticate the iSIM credentials and authorization information 348 in order to authorize the information handling system 300 to access the subscriber-based network resources provided by the carriers 360 associated with the iSIM carrier profile 346. The NID 316 receives authorization data and then may conduct wireless data communication over the WWAN macro-cellular network or small-cell WWAN network 355.

As described herein, the iSIM credential and authorization information 348 may comprise a plurality of sets of authorization information and carrier profile information used by the information handling system 300 to be operatively coupled to a switched multimegabit data (SM-DS) server 350 associated with one or more carrier 360 networks. This allows a user to switch from the services provided by one carrier 360 to those provided by another 360 per the one or more available sets of iSIM credentials and authorization information 348 on the iSIM carrier profile 346. For example, a user may take the information handling system 300 into a geographical area where a first carrier 360 provides no services while a second carrier 360 does. The user may cause the information handling system 300 to switch from the services of the first carrier 360 to those of the second carrier 360 to allow the information handling system 300 to communicate with a wireless network.

Figure 4:
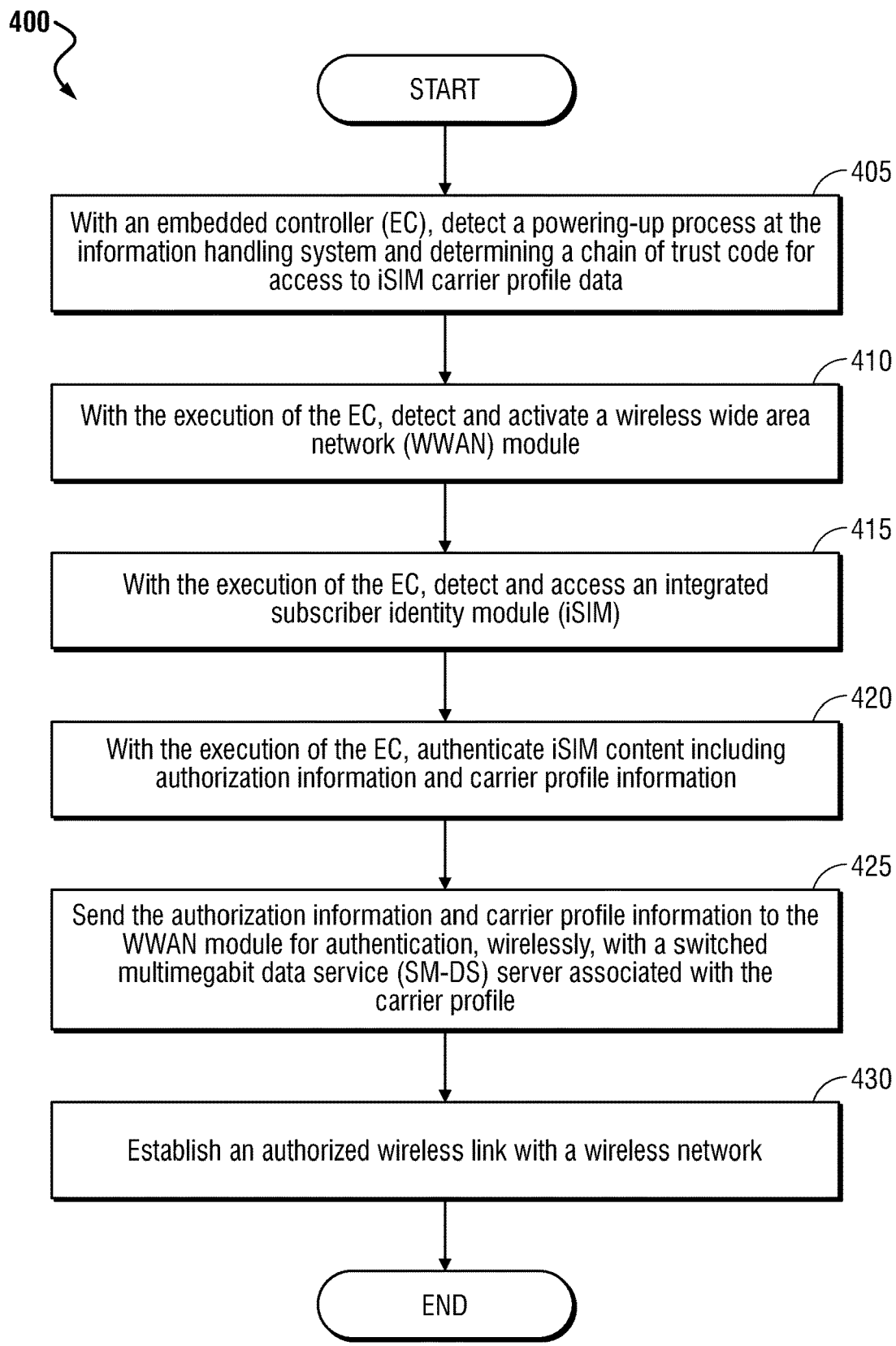
FIG. 4 is a flow diagram of securing functionalities of an iSIM on an information handling system according to an embodiment of the present disclosure.

FIG. 4 is a flow diagram of securing functionalities via an iSIM on an information handling system according to an embodiment of the present disclosure. The method 400 may be used to maintain the security of any iSIM carrier profiles of an iSIM below operations of a BIOS or OS so that this data may be less susceptible to attacks to gain that information from outside entities. This enables secure access to an iSIM carrier profile data to permit access to one or more subscriber-based wireless networks.

The method 400 may begin at block 405 with a user of an information handling system actuating a power button and, with the embedded controller, detecting a powering-up process at the information handling system. In an embodiment, the firmware executed by the EC may include any computer readable program code defining a chain of trust system used to generate securing links to the operations of firmware, software, and hardware of the information handling system during pre-BIOS boot-up processes. By passing or assigning a digital signature from a root node of trust (e.g., the EC) to other nodes of the boot-up process, the EC may maintain a secure means of accessing and transmitting, for example, the iSIM credentials and authorization information.

The method 400 may further include at block 410 detecting and activating a wireless wide area network (WWAN) module or other subscriber-based wireless protocol radio module at the NID of the information handling system by the EC. Again, the execution of the chain of trust system allows the EC to pass on a digital signature indicative that the WWAN module is securely operated by the EC to enable access to the iSIM carrier profile data or to securely transmit the iSIM carrier profile data. As described herein, the WWAN module may be an example of a NID module used by the EC in an embodiment. The present specification contemplates that other types of NID radio modules may be used to operatively couple the information handling system to a wireless network associated with a carrier via subscription.

The method 400 further includes, at block 415, detecting and accessing an iSIM using the EC described herein. Because an iSIM includes the iSIM carrier profiles used to operatively couple the information handling system to a network, the iSIM is defined by computer readable program code that includes those iSIM carrier profiles that define iSIM credentials, subscription profiles, and authorization information used to authorize the information handling system to be communicatively coupled to the wireless network. The iSIM may, therefore, maintain one or more sets of iSIM carrier profiles associated with distinct carriers and the accompanying iSIM credentials and authorization information used to selectively couple the information handling system to those respective wireless networks.

In an example, the EC may detect and access the iSIM in order to access a first or primary iSIM carrier profile associated with a first or primary carrier's network. In this example, the EC may rank the various carrier profiles based on, for example, detected signal strength at the NID for that wireless network. In another embodiment, a primary carrier network may be selected by a user as the preferred wireless network to operatively couple the information handling system to based on cost, bandwidth, signal strength or availability, or other criteria. Any other iSIM carrier profile ranking may also be implemented and executed by the EC so that a preferred or optimal wireless network is accessed.

As described herein, the EC may access the iSIM carrier profile digitally maintained at a memory associated with a WWAN module or other module, at a memory associated with the EC, on a flash memory device, or as part of a memory of a system-on-chip (SOC). Because the iSIM carrier profile may be placed on any chip, memory device, or be formed into its own module, the EC, during boot-up, may access specific hardware or firmware in order to gain access to this information. In an embodiment, the iSIM carrier profile may be formed on a memory device associated with the EC itself. In this embodiment, the EC may not need to access any other hardware to gain access to the iSIM carrier profile thereby increasing the efficiency and speed of operatively coupling the information handling system to a network operated by the appropriate wireless carrier. In another embodiment, the iSIM carrier profile may be maintained on a flash memory device operatively coupled to the information handling system. In this embodiment, during a boot-up process of the information handling system, the EC may, as the root of trust, access a port or other hardware where the flash memory is located, pass on an encrypted digital signature to the hardware using the chain of trust system, and gain access to the iSIM carrier profile maintained on the flash drive. This allows the chain of trust to be maintained while also securing the data maintained on the iSIM carrier profile. In yet another embodiment, the iSIM carrier profile may be integrated into the platform hardware of the information handling system such by either being stored on an existing memory (e.g., associated with a CPU) or stored on a separate module dedicated to storing the iSIM carrier profile. Again, the EC may, as the root of trust, access a port or other hardware where the iSIM carrier profile is located, pass on an encrypted digital signature to the hardware using the chain of trust system, and gain access to the iSIM carrier profile maintained on the memory device. In yet another embodiment, the iSIM carrier profile may be integrated into the NID (e.g., WWAN module) or a memory associated with the NID. In this embodiment, because the EC will gain access to the NID using the chain of trust system as described herein, the placement of the iSIM carrier profile at the NID may allow the EC to access the iSIM carrier profile when access to the NID is completed. This may also reduce the time during boot-up for the EC to be operatively coupled to the network associated with the appropriate wireless carrier. The present specification contemplates that the iSIM carrier profile may be stored and maintained on any memory associated with any hardware device within the information handling system with the ability of the EC, using the chain of trust system, to gain access to this hardware and memory in order to securely and operatively couple the information handling system to the wireless carrier.

The method 400 may continue at block 420 with the EC authenticating the iSIM content including authorization information and carrier profile information. This may be done by executing the chain of trust system as described herein. Additionally, the EC may determine that the authorization information and carrier profile information exists and has been secured wherever on the information handling system the iSIM carrier profiles are maintained.

The method 400 may continue at block 425 with sending the authorization information and carrier profile information to the WWAN module for authentication, wirelessly, with a switched multimegabit data service (SM-DS) server associated with the carrier profile. As described herein, the WWAN module or other MD may send this data to the SMDS sever in order to gain access to the network operated by the carrier. When authorized, the information handling system may communicate with the carrier's network and establish an authorized wireless link with a wireless network at block 430. The establishment of the authorized wireless link may be established with any number of wireless networks via an access point or base station tower. At this point, the method 400 may end. It is appreciated, however, that if and when the information handling system intends to switch from a preferred or primary carrier network to another secondary carrier network. In this situation, the EC may again access the iSIM as described to gain access to the iSIM carrier profile associated with the secondary carrier's network. This may be conducted automatically or upon request by a user to switch network carriers as described herein.

Additionally, the information handling system may periodically receive a ping or signal from the wireless carrier (e.g., from the SM-DS server) requesting, among other data from the information handling system, confirmation that the iSIM credential and authorization information via the authorization information and carrier profile information is authorized to access the network of the wireless carrier. Whatever the frequency of the receipt of the pings from the wireless carrier, the EC may intercept these pings or be the root of trust to access the iSIM carrier profile and the iSIM credential and authorization information to again authenticate access to the wireless carrier network (e.g., network 120) as described herein. This ensures that the data on the iSIM carrier profile and its iSIM credential and authorization information is completed during run-time of the information handling system as well. Indeed, once the EC has handed over operation of the NID to the BIOS firmware/software and OS, the EC may still intercept these pings to authorize this data. This process places the root of trust at the EC by the chain of trust system thereby reducing the occurrence of attacks on the information maintained at the iSIM carrier profile.

Figure 5:
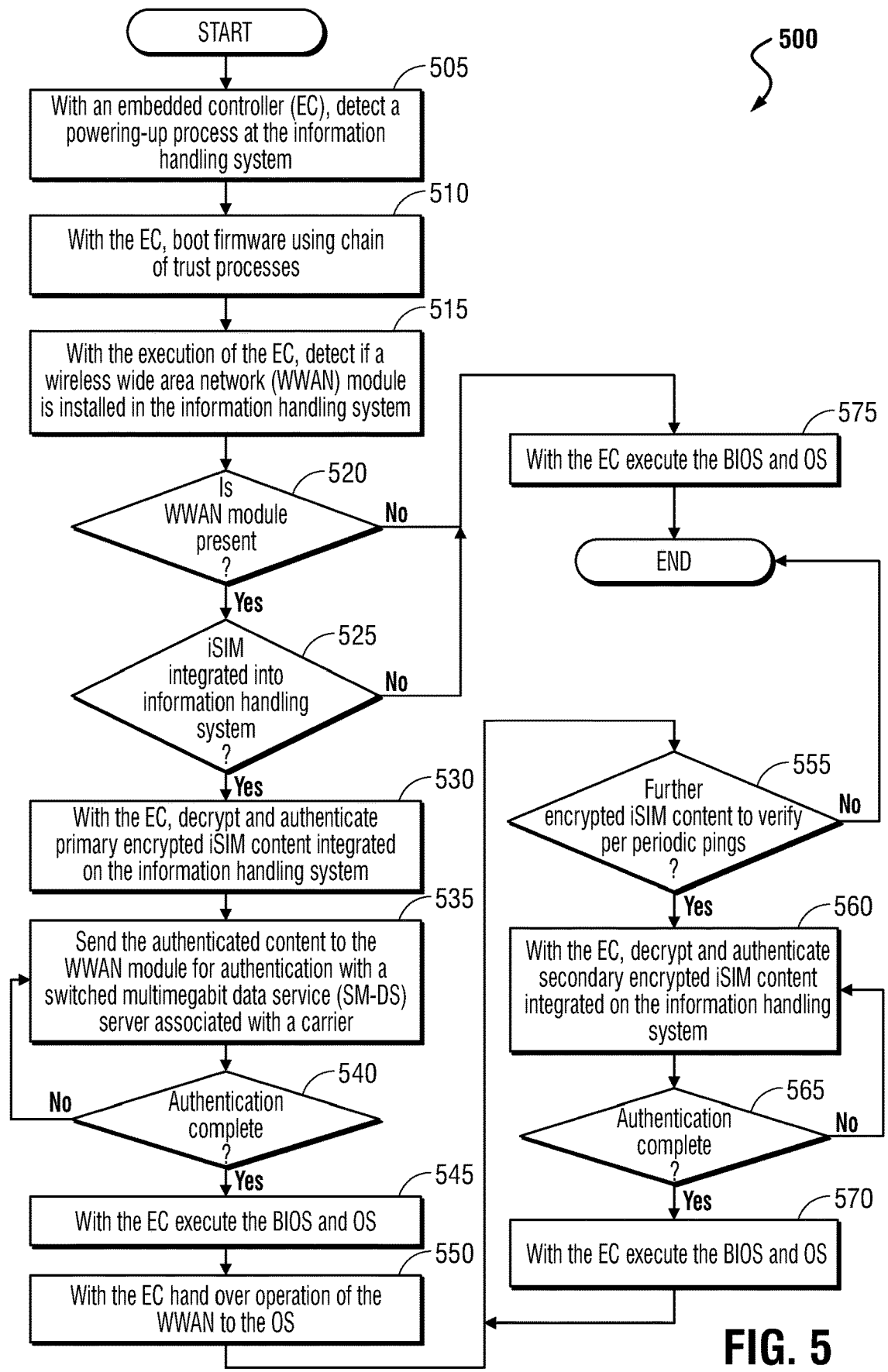
FIG. 5 is a flow diagram of securing functionalities of an iSIM via a chain of trust process on an information handling system according to another embodiment of the present disclosure.

FIG. 5 is a flow diagram of securing functionalities of an iSIM on an information handling system according to another embodiment of the present disclosure. The method 500 may be used to maintain the security of any iSIM carrier profiles of an iSIM with a chain of trust signature from below operations of a BIOS or OS so that this data may be less susceptible to attacks to gain that information from outside entities.

The method 500 may begin at block 505 with a user of an information handling system actuating a power button and, with the embedded controller, detecting a powering-up process at the information handling system. In an embodiment, the firmware executed by the EC may include any computer readable program code defining a chain of trust system, such as a sequential boot of one or more microcontrollers, that may be used to securely link the operations of firmware, software, and hardware of the information handling system. By passing or assigning a digital signature from a root node of trust (e.g., the EC) to other nodes (e.g., a sequence of controllers/microcontrollers), the EC may also maintain a secure means of transmitting, for example, the iSIM credentials and authorization information.

The method 500 may also include, at block 510, with the EC executing a chain of trust process using the chain of trust system described herein. The chain of trust system may, according to the present description, perform tasks related to ensuring that a chain of trust is established between each component of hardware, firmware, and/or software during a boot process. This chain of trust may be established by the EC executing the computer readable program code defining the chain of trust system so that the EC may serve as the root of trust to the validate all other hardware, firmware, and/or software subsequently called by the EC or booted. In an embodiment, only those instances of hardware, firmware, and/or software that have been digitally signed by a proceeding instance of hardware, firmware, and/or software or by the EC may be trusted and therefor allowed to operate on the information handling system. In normal operations, this chain of trust would move forward until the BIOS firmware/software and OS have been initiated. The execution of the chain of trust system by the EC may also utilize digital signature code or codes for boot sequence of controllers up to the BIOS boot. These chain of trust digital signature codes allow the EC to safeguard any potentially sensitive information maintained on the information handling system. In the embodiments described herein, this sensitive information includes the data, information, and content maintained on the iSIM referred to herein as the iSIM carrier profile.

At block 515, the method 500 may continue with the EC detecting whether a WWAN module is present or installed in the information handling system. As described herein, any type of NID device may be detected by the EC including any other than a WWAN module. In the context of the method 500 described here, the WWAN module (e.g., WWAN card) may be specifically used to operatively couple the information handling system to a WWAN or a small cell licensed WWAN such as gNodeB as described. However, the present specification contemplates that any other NID may be used to operatively couple the information handling system to any type of network described herein associated with a wireless carrier that requires subscription authentication via SIM credentials.

The method 500 may, therefore, include a determination at block 520 as to whether a WWAN module is present or not. Where it is determined at block 520 that a WWAN module (or any other NID) is not present, is off, or is idle at the information handling system, the method 500 may continue at block 575 with the EC executing the BIOS and OS to complete the boot-up process. At this point the method 500 may end. In this embodiment, any access to a network may be facilitated using other antenna systems and NID not associated with a wireless carrier and the user may alter the hardware within the information handling system later to accommodate a WWAN module or other NID used to access a wireless carrier network.

Where it is determined at block 520 that a WWAN module (or any other NID) is present, on, or active at the information handling system, the method 500 may continue at block 525 with determining whether an iSIM has been integrated into the information handling system. Because the iSIM and its associated iSIM carrier profiles may be digitally maintained at a memory associated with the WWAN, at a memory associated with the EC, on a flash memory device, or as part of a memory of a system-on-chip (SOC), the chain of trust processes allows the EC to initiate and maintain that chain of trust to any device where this iSIM content is maintained without the OS accessing this content thereby subjecting it to potential attacks. This further allows a computer manufacturer to own a root of trust (e.g., at the EC) to the iSIM and control and manage the keys used for authentication and authorization of the iSIM content. In some instances, multiple sets of authorization information and carrier profile information may be maintained at the iSIM so that the information handling system may switch between an initial or primary wireless carrier and any number of subsequent wireless carriers.

At block 525 where it is determined that an iSIM has not been integrated into the information handling system, the method 500 may continue at block with the EC executing the BIOS and OS to complete the boot-up process at block 575. It is appreciated herein that, while the EC is conducting any other of the processes in blocks 505 through 540, the BIOS and OS may still be loaded by the EC.

At block 525 where it is determined that an iSIM has been integrated into the information handling system, the method may continue at block 530 with decrypting and authenticating a primary encrypted iSIM content integrated on the information handling system using the chain of trust digital signature or digital signatures. In this embodiment, the iSIM includes a plurality of iSIM carrier profiles, one of which has been determined to be a primary iSIM carrier profile as part of the iSIM. This process may be conducted while the EC executes the chain of trust system as described herein to continue the boot of the BIOS firmware/software and OS. Additionally, the EC may determine that the authorization information and carrier profile information exists and has been secured on the information handling system in a secure memory where the iSIM carrier profiles are maintained. In these embodiments, the EC still controls the dissemination of the iSIM carrier profiles and their associated information throughout the hardware of the information handling system through the execution of the chain of trust system described herein.

At block 535, the EC may send the authenticated content to the WWAN module for authentication with a switched multimegabit data service (SM-DS) server associated with a carrier of the subscriber-based network to be accessed. As described herein, regardless of whether the BIOS and OS have been loaded or not, the EC may execute the chain of trust system to provide a digital signature or chain of trust access code or key to the secured iSIM to access the iSIM carrier profile for the WWAN module (or other NID) to securely provide the authenticated content of the primary iSIM carrier profile to a trusted device (e.g., the NID) in the information handling system to be used to authenticate access the carrier WWAN SMDS.

The method 500 may determine at block 540 whether the authentication has been completed. In the embodiments described herein, the EC may receive confirmation from a SM-DS server associated with the wireless carrier, via the NID, that the information handling system is operatively coupled to the wireless carrier network associated with the authorization information and carrier profile information defined in the iSIM carrier profile. The method may iteratively assess at block 540 with the chain of trust digital signature whether to authenticate access to the iSIM content (e.g., other iSIM carrier profile) and, thus, authenticate access to a carrier WWAN until successful.

Where the authentication is complete, the method 500 may continue at block 545 with the EC executing the BIOS and OS to complete the boot-up process. It is appreciated herein that, while the EC is conducting any other of the processes in blocks 505 through 540, the BIOS and OS may still be loaded by the EC. In these embodiments, the EC still controls the dissemination of the iSIM carrier profiles and their associated information throughout the hardware of the information handling system through the execution of the chain of trust system described herein.

At block 550, the EC may hand over operation of the WWAN to the OS for the OS to continue the communication between the information handling system and the wireless carrier network on an authorized wireless link. As described herein, the information handling system may periodically receive a ping or signal from the wireless carrier (e.g., from the SM-DS server) requesting, among other data from the information handling system, confirmation that the iSIM credential and authorization information via the authorization information and carrier profile information is authorized to access the network of the wireless carrier at block 555 according to an optional embodiment. Whatever the frequency of the receipt of the pings from the wireless carrier, the EC may intercept these pings or to be the root of trust to provide chain of trust credentials to access the iSIM carrier profile and the iSIM credential and authorization information to again authenticate access to the wireless carrier network as described herein. This ensures that the data on the iSIM carrier profile and its iSIM credential and authorization information is also completed during run-time of the information handling system as well in some embodiments. Indeed, once the EC has handed over operation of the NID to the BIOS firmware/software and OS, the EC may still intercept these pings to authorize this data access to the iSIM credentials with chain of trust authentication keys based on the digital signatures in an example embodiment. This process places the root of trust at the EC by the chain of trust system thereby reducing the occurrence of attacks on the information maintained at the iSIM carrier profile.

At block 555, the method 500 may include determining whether there is further encrypted iSIM content to verify per those periodically received pings. Where there is not (e.g., primary or selected iSIM content is re-verified), the method may end here with the EC answering the reauthentication requests from the wireless network carrier using the selected or primary iSIM content. However, where further encrypted iSIM content is to be verified per those periodically received pings such as when the user selects to connect to a secondary wireless network carrier, the method 500 continues at block 560 with decrypting and authenticating a secondary encrypted iSIM content integrated on the information handling system. Again, where the iSIM includes a plurality of iSIM carrier profiles, one of which has been determined to be a secondary iSIM carrier profile, this secondary iSIM carrier profile may be used to reconnect the information handling system to a separate network associated with a different wireless carrier. This process may be conducted while the EC executes the chain of trust system to provide secure access to the secondary iSIM credentials in accordance with the embodiments described herein. Additionally, the EC may determine that the authorization information and secondary carrier profile information exists and has been secured wherever on the information handling system the secondary iSIM carrier profile are maintained.

The method 500 may determine at block 565 whether the authentication has been completed. In the embodiments described herein, the EC may receive confirmation from a SM-DS server associated with the wireless carrier, via the NID, that the information handling system is operatively coupled to the wireless carrier network associated with the authorization information and carrier profile information defined in the secondary iSIM carrier profile. The method may iteratively determine at block 565 whether the authentication of the iSIM content is successful. At block 570, the EC may hand over operation of the WWAN to the OS for the OS to continue the communication between the information handling system and the wireless carrier network as described herein. At this point, the method 500 may end.

The blocks of the flow diagrams of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method of securing functionalities of an integrated subscriber identification module (iSIM) on an information handling system, comprising:
with an embedded controller (EC), detecting a powering-up process at the information handling system and determine chain of trust access keys during bootup;
with the execution of the EC, detecting and activating a wireless wide area network (WWAN) module;
with the execution of the EC, detecting and accessing an integrated subscriber identity module (iSIM);
with the execution of the EC, authenticating access to iSIM content including authorization information and carrier profile information with the chain of trust access keys from generated encryption keys based on digital signatures; and
sending the authorization information and carrier profile information from the iSIM to the WWAN module of a network interface device for authentication, wirelessly, with a switched multimegabit data service (SM-DS) server associated with the carrier profile.

2. The method of claim 1 further comprising:
receiving, from the SM-DS server at the WWAN module, authentication of the authorization information and carrier profile information and initiating an operating system (OS) of the information handling system to manage operations of the WWAN module to communicate data to and from WWAN base station.

3. The method of claim 1 further comprising:
periodically responding to pings from the SM-DS server associated with the carrier during communication with the SM-DS server by, via execution of the EC, requesting authentication from the SM-DS server at the WWAN module.

4. The method of claim 1, wherein determining the chain of trust access keys during bootup includes determining a sequence of microcontrollers used to create a chain of trust with the EC as the root of trust and generating the encryption keys based on the digital signatures created from one microcontroller to another microcontroller of the sequence of microcontrollers.

5. The method of claim 1 further comprising:
determining a sequence of microcontrollers used to create a chain of trust and selecting among the microcontrollers among the sequence of microcontrollers to generate the encryption keys based on the digital signatures created from the selected microcontrollers.

6. The method of claim 1, wherein the EC includes instructions for a sequence of microcontrollers to create a chain of trust prior to the booting of a BIOS firmware/software.

7. The method of claim 1, wherein the iSIM is integrated into a dedicated flash module in the information handling system.

8. The method of claim 1, wherein the iSIM is integrated into the EC and includes SIM control logic to communicate with the WWAN.

9. An information handling system operating an integrated subscriber identification module (iSIM) chain of trust system comprising:
a secured memory including an iSIM and SIM control logic;
a power management unit (PMU);
an embedded controller (EC) to:
detect a powering-up process at the PMU of the information handling system;
determine a chain of trust for a boot up sequence of at least one controller prior to boot of a BIOS and creating chain of trust access keys;
detect and access the iSIM with the chain of trust access keys to receive authorization information and carrier profile information;
detect and activate a wireless wide area network (WWAN) module; and
a network interface device (NID) to receive instructions from the EC to send the authorization information and carrier profile information to a switched multimegabit data service (SM-DS) server associated with the carrier profile to authenticate access to a carrier network.

10. The information handling system of claim 9, wherein the NID receives a connection request from the SM-DS server via authentication of the authorization information and carrier profile information and initiates an operating system (OS) of the information handling system to manage operations of the NID to communicate data to and from the carrier network.

11. The information handling system of claim 9, wherein the EC periodically responds to pings from the SM-DS server associated with the carrier during communication with the SM-DS server by requesting authentication from the SM-DS server.

12. The information handling system of claim 9, further comprising:
preventing, with the EC, the boot up of a basic input/output system (BIOS) until the subscription confirmation with the WWAN carrier is initiated by the EC.

13. The information handling system of claim 9, wherein the EC ensures a chain of trust is maintained from the EC to the OS boot as the EC sends the chain of trust access keys to the iSIM to access carrier profile information for use by the NID for authentication with the SM-DS server.

14. The information handling system of claim 9, wherein determining the chain of trust for a boot up sequence includes determining a sequence of microcontrollers used to create a chain of trust with the EC as the root of trust and generating the encryption keys based on the digital signatures created from one microcontroller to another microcontroller of the sequence of microcontrollers.

15. The information handling system of claim 9 wherein determining a chain of trust for a boot up sequence includes determining a sequence of microcontrollers used to create a chain of trust and selecting among the microcontrollers among the sequence of microcontrollers to generate the encryption keys based on the digital signatures created from the selected microcontrollers.

16. The information handling system of claim 15 wherein determining a sequence of microcontrollers used to create a chain of trust and selecting among the microcontrollers among the sequence of microcontrollers to generate the encryption keys is based on the digital signatures created from the selected microcontrollers.

17. The information handling system of claim 15 wherein the secured iSIM memory location is a memory on the NID and is accessed by the EC via the chain of trust access keys.

18. A method of securing a chain of trust during the operation of an integrated subscriber identification module (iSIM) on an information handling system, comprising:
- with an embedded controller (EC), detecting a powering-up process at the information handling system and booting firmware associated with a network interface device (NID);
- determine chain of trust access keys during boot up process of plural controllers before BIOS boot up;
- with the EC, detecting the integration of the iSIM on a memory associated with the EC and accessing with the chain of trust access keys carrier authorization profiles associated with one or more wireless carrier networks in a secured iSIM memory location;
- with the execution of the NID by the EC, sending the carrier authorization profiles for authentication with wireless carrier services associated with the one or more carrier authorization profiles; and
- initiating the boot-up of a basic input/output system (BIOS) and an operating system (OS) of the information handling system to manage operations of the NID to communicate data to and from the wireless carrier services upon confirmation of the chain of trust form the EC and authorization from the wireless carrier services.

19. The information handling system of claim 18 further comprising:
- periodically responding to pings from the wireless carrier services associated with the one or more carrier authorization profiles during communication with the wireless carriers by, via execution of the EC, requesting re-authentication from the wireless carrier services.

20. The information handling system of claim 18 wherein determining the chain of trust access keys during bootup includes determining a sequence of microcontrollers used to create a chain of trust with the EC as the root of trust and generating the encryption keys is based on the digital signatures created from one microcontroller to another microcontroller of the sequence of microcontrollers.

* * * * *